United States Patent
Hong et al.

[11] Patent Number: 6,105,387
[45] Date of Patent: Aug. 22, 2000

[54] TWO PASS EVAPORATOR

[75] Inventors: Kwangtaek Hong, Ann Arbor; Alexander Kargilis, Southfield, both of Mich.

[73] Assignee: DaimlerChrysler Corporation, Auburn Hills, Mich.

[21] Appl. No.: 09/305,498

[22] Filed: May 5, 1999

[51] Int. Cl.[7] .................................................. F25B 39/02
[52] U.S. Cl. ............................... 62/524; 62/176.1; 62/199
[58] Field of Search ............................. 62/199, 200, 150, 62/176.1, 176.2, 176.6, 524, 525

[56] References Cited

U.S. PATENT DOCUMENTS

| 2,127,991 | 8/1938 | Candor . |
| 2,146,483 | 2/1939 | Philipp . |
| 2,162,860 | 6/1939 | Philipp . |
| 2,249,856 | 7/1941 | Ruff . |
| 2,940,281 | 6/1960 | Armstrong . |
| 3,733,845 | 5/1973 | Lieberman . |
| 3,779,031 | 12/1973 | Akiyama et al. .......................... 62/160 |
| 4,691,527 | 9/1987 | Ikeda ......................................... 62/234 |
| 4,873,837 | 10/1989 | Murray . |
| 5,065,586 | 11/1991 | Shapiro-Baruch . |
| 5,253,482 | 10/1993 | Murway ..................................... 62/175 |
| 5,267,450 | 12/1993 | Takegawa et al. ..................... 62/176.2 |

*Primary Examiner*—Henry Bennett
*Assistant Examiner*—Marc Norman
*Attorney, Agent, or Firm*—Kenneth H. Maclean

[57] ABSTRACT

An air conditioning system including a refrigeration system with two evaporators having dissimilar heat transfer surfaces which combine to produce a cooling effect. The first evaporator includes a first heat transfer surface with a high efficiency or heat rejection (heat absorption) rate which is optimally configured for use in an environment having a low humidity level. The second evaporator includes a second heat transfer surface with a lower efficiency or lower heat rejection (heat absorption) rate as compared to the first heat transfer surface but which performs better in environments having higher humidity levels. Refrigerant to the first and second evaporators is controlled for a given ambient air humidity level to attain maximum efficiency. A cooling method for a refrigeration system is also provided.

20 Claims, 1 Drawing Sheet

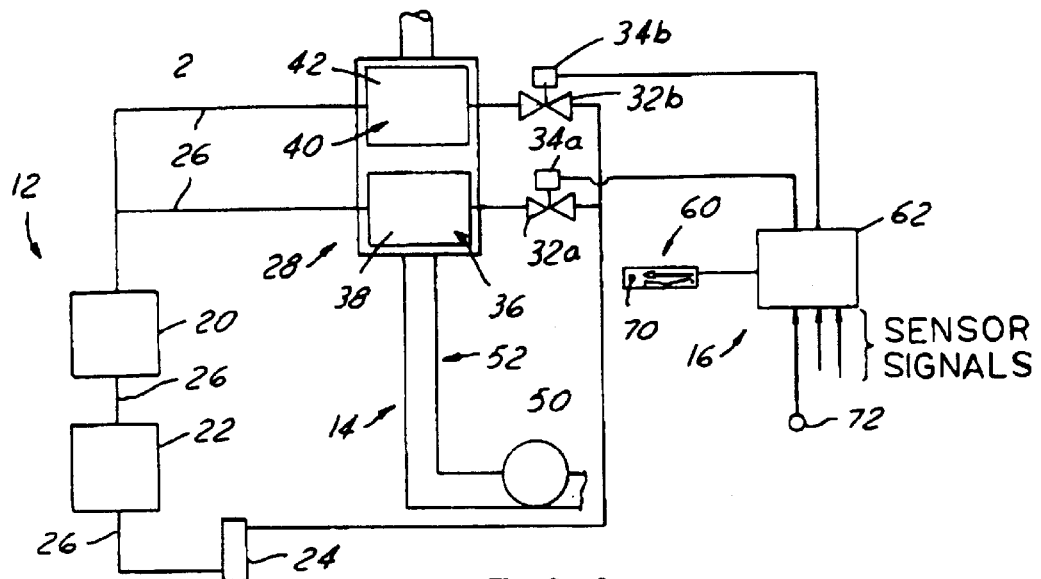
FIG. 1
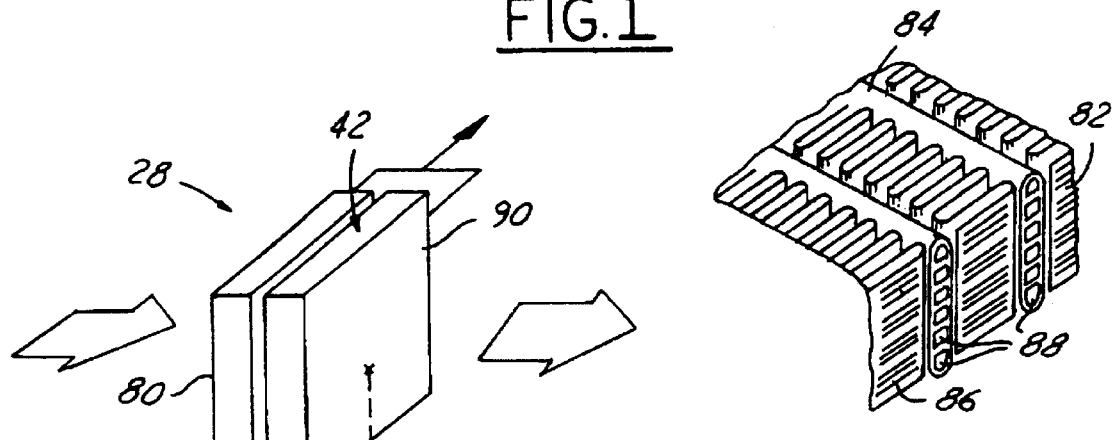
FIG. 2
FIG. 3
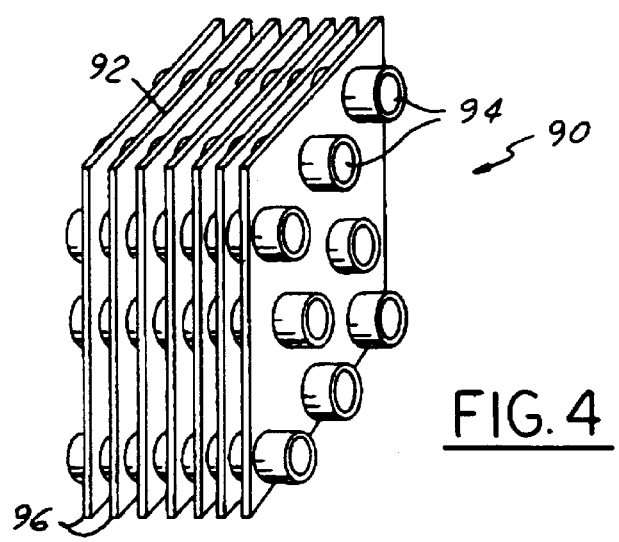
FIG. 4

TWO PASS EVAPORATOR

BACKGROUND OF THE INVENTION

1. Technical Field

The present invention relates generally to air conditioning systems and more particularly to an air conditioning system which utilizes a refrigeration system having two evaporators.

2. Discussion

Most modern automotive vehicles have air conditioning devices which both cool and dehumidify the air drawn into and circulated within the passenger compartment of the vehicle. These air conditioning devices typically employ a single evaporator to chill the air being circulated through the air conditioning system. This approach, however, has several inherent drawbacks.

One significant drawback concerns the efficiency of the evaporator at different humidity levels. The evaporators having relatively high heat transfer rates tend to flood at higher humidity levels, causing a build-up of condensate on the heat transfer surface which substantially reduces the efficiency of the evaporator. To combat such situations, many air conditioning systems have relied on hydrophilic coatings or less efficient evaporator designs, including those with fewer fin counts. Hydrophilic coatings increase the surface tension on the heat transfer surface to facilitate a "shedding" effect to drain condensation from the heat transfer surface to prevent the condensate from bridging the fins. Such coatings are relatively expensive to apply and lose their effectiveness over time such that the shedding effect produced does not last the life of the vehicle. As such, the evaporator efficiency is reduced over time even where hydrophilic coatings are employed.

The refrigeration system compressor compensates for any degradation in evaporator performance which results from the loss in effectiveness of hydrophilic coatings by working the refrigeration system compressor harder (e.g., more frequently and/or longer). The compressor typically consumes a large amount of power when it operates, which results in a substantial penalty in power available for use in propelling the vehicle. This problem is particularly troublesome when such systems are incorporated into automotive vehicles as the fuel economy and performance of the vehicle can be substantially impaired during the operation of the air conditioning system.

Accordingly, there remains a need in the art for an improved refrigeration system for an air conditioning system that provides improved heat transfer efficiency over a predetermined range of humidity levels.

SUMMARY OF THE INVENTION

It is therefore one object of the present invention to provide an improved refrigeration system for an air conditioning system.

It is a more specific object of the present invention to provide an improved refrigeration system which utilizes two evaporators having dissimilar heat transfer surfaces to improve the overall efficiency of the refrigeration system.

It is another object of the present invention to provide a refrigeration system which utilizes a first evaporator of a first type and a second evaporator of a second type to maximize the efficiency of the refrigeration system for a predetermined range of humidity levels.

The air conditioning system of the present invention includes a refrigeration system with two evaporators having dissimilar heat transfer surfaces which combine to produce a cooling effect. The first evaporator includes a first heat transfer surface with a high efficiency or heat rejection (heat absorption) rate which is optimally configured for use in an environment having a low humidity level. The second evaporator includes a second heat transfer surface with a lower efficiency or lower heat rejection (heat absorption) rate as compared to the first heat transfer surface but which performs better in environments having higher humidity levels. Refrigerant to the first and second evaporators is controlled for a given ambient air humidity level to attain maximum efficiency. A cooling method for a refrigeration system is also provided.

Additional advantages and features of the present invention will become apparent from the subsequent description and the appended claims, taken in conjunction with the accompanying drawings.

BRIEF DESCRIPTION OF THE DRAWINGS

FIG. 1 is a schematic diagram of the air conditioning system of the present invention;

FIG. 2 is an enlarged portion of the schematic diagram shown in FIG. 1 showing the flow paths of the refrigerant and the air;

FIG. 3 is a partial perspective view of a portion of the first evaporator;

FIG. 4 is a partial perspective view of a portion of the second evaporator.

DETAILED DESCRIPTION OF THE PREFERRED EMBODIMENT

With reference to FIGS. 1 and 2, the air conditioning system of the present invention is generally indicated by reference numeral 10. Air conditioning system 10 includes a refrigerant system 12, an air circulation system 14 and a control system 16. Refrigerant system 12 includes a compressor 20, a condenser 22, a receiver 24, a refrigerant conduit 26, a two-pass evaporator 28, and first and second flow control (throttling) valves 30a and 30b, respectively.

Refrigerant conduit 26 couples compressor 20, condenser 22, receiver 24, first and second flow control valves 30a and 30b and two-pass evaporator 28 together to permit the flow of refrigerant therebetween. Gaseous refrigerant having a first pressure is drawn into compressor 20 where it is compressed. The refrigerant exits compressor 20 at a second, higher pressure and flows into condenser 22 where it is cooled and condensed into a liquid. The liquid refrigerant flows through receiver 24 where it is filtered, demoisturized and stored for use as required to meet the cooling demands placed on air conditioning system 10.

Liquid refrigerant flowing from receiver 24 toward two-pass evaporator 28 branches off into two flow paths which are independently controlled by first and second flow control valves 30a and 30b, respectively. First and second flow control valves 30a and 30b each include a valve portion 32a and 32b, respectively and an actuator 34a and 34b, respectively.

Flow control valve 30a is operable for controlling the amount of refrigerant which flows through the first flow path. Valve portion 32a is selectively positionable at a range of positions including a fully closed position and a fully open position, wherein the range of positions are operable for metering the amount of refrigerant which passes through flow control valve 30a. Actuator 34a is coupled to valve portion 32a and to control system 16. Actuator 34a is operable for selectively opening and closing valve portion 32a in response to a control command generated by control system 16 to meter the amount of refrigerant flowing through flow control valve 30a. Refrigerant passing through first flow control valve 30a enters a first portion 36 of two-pass evaporator 28. First portion 36 includes a first evaporator 38 and will be discussed in greater detail below.

Flow control valve 30b is operable for controlling the amount of refrigerant which flows through the second flow path. Valve portion 32b is selectively positionable at a range of positions including a fully closed position and a fully open position, wherein the range of positions are operable for metering the amount of refrigerant which passes through flow control valve 30b. Actuator 34a is coupled to valve portion 32 and to control system 16. Actuator 34b is operable for selectively opening and closing valve portion 32b in response to a control command generated by control system 16 to meter the amount of refrigerant flowing through flow control valve 30b. Refrigerant passing through second flow control valve 30b enters a second portion 40 of two-pass evaporator 28. Second portion 40 includes a second evaporator 42 and will be discussed in greater detail below. Refrigerant exiting first portion 36 and second portion 38 is combined and returned to compressor 20.

Air circulation system 14 includes a blower 50 and an air duct system 52. Blower 50 is operable for drawing air into air duct system 52 and pushing it through two-pass evaporator 28 to cool and dehumidify the air. More specifically, air duct system 52 initially routes the air through first portion 36 for initial cooling and then through second portion 40 for further cooling before it is directed toward the passenger compartment of the vehicle.

Control system 16 includes a control panel 60, an electronic control module 62 and a plurality of sensors operable for sensing a plurality of system dynamics and producing sensor signals in response thereto. Control panel 60 includes a switch 70 for producing an output signal which is used to enable the operation of refrigerant system 12. Electronic control module 62 is coupled to control panel 60, the plurality of sensors, compressor 20, actuator 34a and actuator 34b. The plurality of sensors and a predetermined control methodology cooperate to enable control module 62 to determine the temperature and the humidity level of the ambient air. Preferably, the plurality of sensors includes a humidistat 72 operable for sensing the amount of water vapor in the ambient air and producing a signal in response thereto. The signal produced by humidistat 72 may be a discrete signal which is generated in response to the detection of a humidity level indicates whether a predetermined humidity level has been detected, or preferably a signal which varies in proportion to the humidity level. However, those skilled in the art should understand that the humidity level of the ambient air may be sensed directly or indirectly. It is therefore within the scope of the present invention to monitor the degree to which condensation forms on one or more of the evaporators to indirectly determine the humidity level of the ambient air. Electronic control module 62 is operable for receiving the output signal from control panel 60 and controlling the operation of refrigerant system 12 in response to the plurality of sensor signals. Electronic control module 62 is operable for controlling the operation of compressor 20 and for generating command signals to first and second flow control valves 30a and 30b operable for causing actuators 34a and 34b to selectively open and close according to the sensed humidity level and the predetermined control methodology.

First evaporator 38, preferably includes a first heat transfer surface 80 that is designed primarily for quick and efficient cooling of the air circulated through it, such as that provided by a parallel flow evaporator 82 as shown in FIG. 3 or a plate-and-fin evaporator (not shown). Parallel flow evaporator 82 is shown to include a plurality of fluid conduits 84 and a plurality of heat transfer fins 86. Each fluid conduit 84 includes a plurality of flow channels 88 which effectively increase the surface area of the fluid conduits 84. Each heat transfer fin 86 is serpentine shaped and is fixed to two parallel fluid conduits 84. Air circulated through air conditioning system 10 releases heat to heat transfer fins 86 as it passes through first evaporator 38. This heat is conducted through heat transfer fins 86 to the adjacent fluid conduits 84 where it is absorbed by the refrigerant flowing through first evaporator 38.

While such evaporators typically perform well when cooling air having a relatively low relative humidity level, their heat rejection (heat absorption) performance is substantially impaired when cooling air with a relatively high humidity level due to their tendency to flood with condensate. The flooding of these high-efficiency evaporators permits the condensate to bridge the heat transfer fins (e.g., heat transfer fins 86) and as a result, the condensate often freezes onto heat transfer surface 80. The bridging of the heat transfer fins (e.g., heat transfer fins 86) effectively reduces the heat transfer area of first evaporator 38 and prevents efficient conduction of heat from the air to the refrigerant in first evaporator 38. However, due to the manner in which air conditioning system 10 is controlled, first evaporator 38 preferably does not include a hydrophilic coating over first heat transfer surface 80 so as to reduce the cost of air conditioning system 10.

Second evaporator 42, preferably includes a second heat transfer surface 90 that is also designed for quick and efficient cooling of the air circulated through it, such as that provided by a tube-and-fin evaporator 92 as shown in FIG. 4. Tube-and-fin evaporator 92 is shown to include a plurality of fluid conduits 94 and a plurality of heat transfer fins 96. Each heat transfer fin 96 is fixed in a perpendicular orientation to the fluid conduits 94. Air circulated through air conditioning system 10 releases heat to heat transfer fins 96 as it passes through second evaporator 42. This heat is conducted through heat transfer fins 96 to the adjacent fluid conduits 94 where it is absorbed by the refrigerant flowing through second evaporator 42.

As compared to first heat transfer surface 80, second heat transfer surface 90 is configured in a manner to provide improved heat rejection performance with air having a relatively high humidity level. As such, second heat transfer surface 90 is configured in a manner to have less efficient heat rejection (heat absorption) characteristics than first heat transfer surface 80 so as to permit condensate to drain from second evaporator 42 without bridging heat transfer fins 96. Preferably, second evaporator 42 does not include a hydrophilic coating over second heat transfer surface 90 so as to reduce the cost of air conditioning system 10.

In operation, a first portion of the refrigerant is directed to first evaporator 38 and a second portion of the refrigerant is directed to second evaporator 42. The amount of the first refrigerant portion relative to the second refrigerant portion is controlled by control module 62 in relation to the humidity level of the air so as to maximize the cooling capacity of air conditioning system 10. More specifically, the amount of first refrigerant portion is controlled for a given ambient air temperature and ambient air humidity level to cause first evaporator 38 to produce its maximum cooling effect. The remaining refrigerant, if any, then comprises the second refrigerant portion and is directed to second evaporator 42.

By way of example, if first evaporator 38 was most efficient at point just prior to the formation of condensation on first heat transfer surface 80, the first refrigerant portion would be controlled to maintain first evaporator 38 at a temperature just above the dew point of the ambient air so as to prevent water from condensing onto first evaporator 38. When the vehicle is operating in an environment having a relatively low humidity level, control module is operable for generating command signals to actuators 34a and 34b to adjust valve portions 32a and 32b according to a predetermined control methodology to control the flow of refrigerant such that the first refrigerant portion is greater than the second refrigerant portion. Operation in this manner directs a majority of the refrigerant to first evaporator 38 which is more efficient in such environmental conditions.

When the vehicle is operating in an environment having a relatively high humidity level, control module is operable for generating command signals to actuators 34a and 34b to adjust valve portions 32a and 32b, respectively according to a predetermined control methodology to control the flow of refrigerant such that the first refrigerant portion is less than the second refrigerant portion. Operation in this manner directs a majority of the refrigerant to second evaporator 42 which is more efficient in such environmental conditions.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A refrigeration system comprising:
   a condenser receiving a substantially gaseous refrigerant and producing a substantially liquid refrigerant;
   a first evaporator having a first heat transfer surface and operable for evaporating a first portion of said substantially liquid refrigerant;
   a second evaporator having a second heat transfer surface and operable for evaporating a second portion of said substantially liquid refrigerant; and
   a controller operable for selectively controlling a magnitude of said first portion in response to an ambient air humidity level.

2. The refrigeration system of claim 1, wherein said first heat transfer surface is more efficient than said second heat transfer surface.

3. The refrigeration system of claim 2, wherein said first evaporator is a parallel flow type evaporator.

4. The refrigeration system of claim 2, wherein said second evaporator is a tube-and-fin type evaporator.

5. The refrigeration system of claim 2, wherein said first refrigerant portion is controlled to maintain said first evaporator at a temperature above an ambient air dew point.

6. The refrigeration system of claim 2, wherein said magnitude of said first portion decreases as said ambient air humidity level increases.

7. The refrigeration system of claim 1, further comprising a first flow control valve operable between a substantially closed position and a substantially open position, said controller controlling a position of said first flow control valve between said substantially closed and open positions to meter said refrigerant to said first evaporator.

8. The refrigeration system of claim 7, further comprising a second flow control valve operable between a substantially closed position and a substantially open position, said controller controlling a position of said second flow control valve between said substantially closed and open positions to meter said refrigerant to said second evaporator.

9. A cooling method for an automotive air conditioning system comprising the steps of:
   determining an ambient air humidity level;
   condensing a substantially gaseous refrigerant with a condenser to produce a substantially liquid refrigerant;
   evaporating a first portion of said substantially liquid refrigerant in a first evaporator having a first heat transfer surface, a magnitude of said first portion controlled in relation to said ambient air humidity level;
   evaporating a second portion of said substantially liquid refrigerant in a second evaporator having a second heat transfer surface.

10. The cooling method for an automotive air conditioning system of claim 9, wherein said first heat transfer surface is more efficient than said second heat transfer surface.

11. The cooling method for an automotive air conditioning system of claim 10, wherein said magnitude of said first portion decreases as said ambient air humidity level increases.

12. The cooling method for an automotive air conditioning system of claim 11, wherein the step of evaporating a first portion of said substantially liquid refrigerant in a first evaporator includes the steps of:
   determining an ambient air dew point; and
   controlling said magnitude of said first refrigerant portion to operate said first evaporator at a temperature above said ambient air dew point.

13. An air conditioning system for a vehicle comprising:
   a condenser receiving a substantially gaseous refrigerant and producing a substantially liquid refrigerant;
   a first evaporator having a first heat transfer surface and operable for evaporating a first portion of said substantially liquid refrigerant;
   a first flow control valve coupled to said first evaporator, said first flow control valve having a first valve portion and a first actuator, said actuator operable for selectively positioning said first valve portion between a first position and a second position to control a magnitude of said first refrigerant portion;
   a second evaporator having a second heat transfer surface and operable for evaporating a second portion of said substantially liquid refrigerant; and
   a second flow control valve coupled to said second evaporator, said second flow control valve having a second valve portion and a second actuator, said second actuator operable for selectively positioning said second valve portion between a first position and a second position to control a magnitude of said second refrigerant portion;

at least one sensor operable for sensing at least one characteristic indicative of an ambient air humidity level and producing a sensor signal in response thereto; and a controller coupled to said at least one sensor, said controller operable for selectively controlling a magnitude of said first refrigerant portion in response to said ambient air humidity level.

14. The air conditioning system for a vehicle of claim 13, wherein said at least one sensor directly measures said ambient air humidity level.

15. The air conditioning system for a vehicle of claim 14, wherein said at least one sensor includes a humidistat.

16. The air conditioning system for a vehicle of claim 13, wherein said at least one sensor measures said ambient air humidity indirectly.

17. The air conditioning system for a vehicle of claim 13, wherein said first heat transfer surface is more efficient than said second heat transfer surface.

18. The air conditioning system for a vehicle of claim 17, wherein said magnitude of said first portion decreases as said ambient air humidity level increases.

19. The air conditioning system for a vehicle of claim 17, wherein said first evaporator is a parallel flow type evaporator.

20. The air conditioning system for a vehicle of claim 17, wherein said second evaporator is a tube-and-fin type evaporator.

* * * * *